US012704740B2

(12) United States Patent
Niiyama

(10) Patent No.: US 12,704,740 B2
(45) Date of Patent: Aug. 11, 2026

(54) OPTICAL STRUCTURE INCLUDING HALF-SILVERED MIRROR AND SELECTIVE REFLECTION FILM IN COMBINATION

(71) Applicant: AGC Inc., Tokyo (JP)

(72) Inventor: Satoshi Niiyama, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 636 days.

(21) Appl. No.: 18/147,884

(22) Filed: Dec. 29, 2022

(65) Prior Publication Data

US 2023/0140492 A1 May 4, 2023

Related U.S. Application Data

(63) Continuation of application No. PCT/JP2021/025028, filed on Jul. 1, 2021.

(30) Foreign Application Priority Data

Jul. 10, 2020 (JP) ................................ 2020-119408

(51) Int. Cl.
*G02B 27/28* (2006.01)
*G02B 5/30* (2006.01)

(52) U.S. Cl.
CPC ......... *G02B 27/288* (2013.01); *G02B 5/3016* (2013.01); *G02B 5/3083* (2013.01); *G02B 27/281* (2013.01)

(58) Field of Classification Search
CPC .... G02B 27/288; G02B 27/281; G02B 27/28; G02B 27/283; G02B 5/3016;
(Continued)

(56) References Cited

U.S. PATENT DOCUMENTS 5,635,105 A 6/1997 Kawata et al.
2007/0263152 A1* 11/2007 Mazaki ................ G02B 5/3083 349/118

(Continued)

FOREIGN PATENT DOCUMENTS

EP 1 744 901 B1 10/2007
JP 8-27284 A 1/1996

(Continued)

OTHER PUBLICATIONS

JP 2019137085, Niiyama Satoshi, published Aug. 22, 2019, English language machine translation generated Jun. 10, 2025 (Year: 2019).*

(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

An optical structure includes a half-silvered mirror and a selective reflection film. The half-silvered mirror includes a first support member and a partial reflection film. The partial reflection film presents a mirror image on the front surface side of the first support member. The selective reflection film is opposed to the partial reflection film. The selective reflection film more readily transmits one of left-handed circularly polarized light and right-handed circularly polarized light, which is hereinafter referred as F polarized light, than the other, which is hereinafter referred as R polarized light. A reflectance of the selective reflection film for the R polarized light is higher than a reflectance of the partial reflection film for the F polarized light throughout a visible light range. An air gap layer is provided between the selective reflection film and the partial reflection film. The optical structure further includes a second support member.

(Continued)

The selective reflection film is stacked on a front surface of the second support member.

17 Claims, 6 Drawing Sheets

(58) Field of Classification Search
CPC ...... G02B 5/3083; G02B 5/30; G02B 5/3025; G02B 5/08; G02B 5/0816; G02B 5/085; G02B 1/11; G02B 1/14; G02B 27/286
See application file for complete search history.

(56) References Cited

U.S. PATENT DOCUMENTS

| | | | | |
|---|---|---|---|---|
| 2010/0025641 | A1 | 2/2010 | Jimbo et al. | |
| 2012/0075568 | A1* | 3/2012 | Chang | G02F 1/133536 349/194 |
| 2012/0086904 | A1 | 4/2012 | Oki et al. | |
| 2016/0170262 | A1 | 6/2016 | Saneto et al. | |
| 2017/0153370 | A1* | 6/2017 | Maruyama | C09K 19/3852 |
| 2018/0299610 | A1* | 10/2018 | Saito | G02B 6/0036 |
| 2018/0321554 | A1 | 11/2018 | Niiyama | |
| 2019/0056540 | A1 | 2/2019 | Taguchi et al. | |
| 2020/0017029 | A1 | 1/2020 | Taguchi et al. | |

FOREIGN PATENT DOCUMENTS

| | | | |
|---|---|---|---|
| JP | 2003-186413 | A | 7/2003 |
| JP | 2004-240092 | A | 8/2004 |
| JP | 2009-534692 | A | 9/2009 |
| JP | 2010-61119 | A | 3/2010 |
| JP | 2011-203426 | A | 10/2011 |
| JP | 2012-22381 | A | 2/2012 |
| JP | 2015-41095 | A | 3/2015 |
| JP | 2017-122776 | A | 7/2017 |
| JP | 2017-198961 | A | 11/2017 |
| JP | 3217121 | U | 7/2018 |
| JP | 2019-137085 | A | 8/2019 |
| WO | WO 2007/126148 | A1 | 11/2007 |
| WO | WO 2010/143683 | A1 | 12/2010 |
| WO | WO 2016/088787 | A1 | 6/2016 |
| WO | WO 2017/126624 | A1 | 7/2017 |
| WO | WO 2018/198559 | A1 | 11/2018 |

OTHER PUBLICATIONS

International Search Report issued Aug. 10, 2021 in PCT/JP2021/025028 filed on Jul. 1, 2021 3 pages.

* cited by examiner

OPTICAL STRUCTURE INCLUDING HALF-SILVERED MIRROR AND SELECTIVE REFLECTION FILM IN COMBINATION

INCORPORATION BY REFERENCE

This application is based upon and claims the benefit of priority from Japanese Patent Application No. 2020-119408 filed on Jul. 10, 2020, and PCT application No. PCT/JP2021/025028 filed on Jul. 1, 2021, the disclosure of which is incorporated herein in its entirety by reference.

BACKGROUND

The present invention relates to an optical structure including a half-silvered mirror and a selective reflection film in combination.

International Patent Publication No. WO2017/126624 discloses a light reflecting and transmitting member which is a type of half-silvered mirror. This light reflecting and transmitting member includes a support member and an optical thin film stacked on a back surface of the support member. The optical thin film reflects a portion of light, and transmits the remaining portion. The optical thin film transmits image light emitted from the back surface side. The light reflecting and transmitting member therefore exerts a display property. The optical thin film reflects external light emitted from the front surface. The light reflecting and transmitting member therefore exerts a mirror property.

A selective reflection film is further stacked on the optical thin film. The selective reflection film selectively transmits one of left-handed circularly polarized light and right-handed circularly polarized light, and selectively reflects the other. For example, image light consisting of left-handed circularly polarized light is incident on a back surface of the light reflecting and transmitting member, that is, the selective reflection film. The selective reflection film transmits the left-handed circularly polarized light, and reflects right-handed circularly polarized light. The left-handed circularly polarized light transmitted through the selective reflection film performs multiple reflection between the optical thin film and the selective reflection film. At this time, the image light interchanges circling directions each time reflection is performed. The transmittance of the optical thin film for the left-handed circularly polarized light is higher than the transmittance of the selective reflection film for the right-handed circularly polarized light. Thus, the image light is preferentially output from the optical thin film side while repeating multiple reflection. Therefore, the selective reflection film brightens an image displayed on the light reflecting and transmitting member.

By appropriately designing the optical structure including the optical thin film and the selective reflection film in combination, the sum of the transmittance for image light and the reflectance for external light exceeds 100% as viewed from a viewer who views a front surface of the optical structure.

The paragraph [0057] of Japanese Unexamined Patent Application Publication No. 2019-137085 discloses that an interface of a selective reflection film opposed to a half-silvered mirror similar to the above-described one is formed of resin or air. The paragraph [0060] discloses that an interface of a reflection film of the half-silvered mirror on the side opposed to the selective reflection film is formed of resin or air. The paragraph [0059] discloses that in a case where air is interposed between the reflection film and the selective reflection film, it is difficult to keep the distance between the reflection film and the selective reflection film constant. The same paragraph discloses that air may be removed by further interposing transparent resin having an even thickness.

Japanese Unexamined Patent Application Publication No. 2017-122776 and Japanese Unexamined Patent Application Publication No. 2017-198961 disclose a mirror with an image display function and a half-silvered mirror each including a circularly polarized light reflection layer. The paragraph [0151] and FIG. 12 of Published Japanese Translation of PCT International Publication for Patent Application, No. 2009-534692 disclose a structure in which a cholesteric reflector and a 50% mirror are arranged at an appropriate distance. FIG. 6 of Description of European Patent No. 1744901 discloses a structure having an air gap inside.

SUMMARY

The present invention has an object to provide an optical structure including a half-silvered mirror and a selective reflection film in combination with means suitable for further increasing the reflectance on a front surface side of the half-silvered mirror.

[1] An optical structure including a half-silvered mirror and a selective reflection film in combination, in which the half-silvered mirror includes a first support member and a partial reflection film stacked on a back surface of the first support member, the partial reflection film reflects external light incident from a front surface side of the first support member to present a mirror image on the front surface side of the first support member, the selective reflection film is provided further to a back surface side of the half-silvered mirror so as to be opposed to the partial reflection film, throughout a visible light range, the selective reflection film more readily transmits one of left-handed circularly polarized light and right-handed circularly polarized light, which is hereinafter referred to as F polarized light, than the other, which is hereinafter referred to as R polarized light, and more readily reflects the R polarized light than the F polarized light, a reflectance of the selective reflection film for the R polarized light is higher than a reflectance of the partial reflection film for the F polarized light throughout the visible light range, an air gap layer is provided between the selective reflection film and the partial reflection film, the optical structure further including a second support member opposed to the first support member, in which the selective reflection film is stacked on a front surface of the second support member.

[2] The optical structure described in [1], in which the selective reflection film consists of either liquid crystal of a nematic liquid crystal and a smectic liquid crystal, the liquid crystal consists of a phase having chirality, the phase consists of liquid crystal molecules with a chiral dopant added or liquid crystal molecules having chirality, and a protection film is further formed on a front surface of the selective reflection film.

[3] The optical structure described in [1], in which the selective reflection film consists of a cholesteric liquid crystal, and a protection film is further formed on a front surface of the selective reflection film.

[4] The optical structure described in any one of [1] to [3], in which the air gap layer consists of a space filled with air or gas other than air, and the partial reflection film consists of one of a dielectric multilayer film and a single-layer film of metal oxide, and is exposed to the space.

[5] The optical structure described in any one of [1] to [4], in which an antireflection film is further formed on a front surface of the selective reflection film.

[6] The optical structure described in any one of [1] to [5], in which an antireflection film is further formed on a back surface of the second support member.

[7] The optical structure described in any one of [1] to [6], in which the half-silvered mirror has a reflectance larger than a transmittance.

[8] The optical structure described in any one of [1] to [7], in which a quarter wave plate is further stacked between the selective reflection film and the second support member.

[9] Use of the optical structure described in [8] including:

emitting image light consisting of linear polarized light or elliptically polarized light to a back surface side of the second support member to transform the image light into image light consisting of the F polarized light with the quarter wave plate;

outputting the image light consisting of the F polarized light through a front surface of the first support member to present an image brighter than the mirror image on the front surface of the first support member in a manner superimposed on the mirror image; and darkening the image light emitted to the back surface side of the second support member to recover the mirror image buried in the image on the front surface of the first support member.

[10] A transmission display mirror which is a mirror that displays an image in a manner superimposed on a mirror image, including:

the optical structure described in [9]; and a display panel configured to emit image light consisting of linear polarized light to a back surface of the second support member, in which the display panel has a display surface that is opposed to the back surface of the second support member and outputs the image light consisting of the linear polarized light, the quarter wave plate has a fast axis and a slow axis tilted at 45° with respect to a polarizing axis of the linear polarized light in a direction in which the linear polarized light is transformed into polarized light Fp, and an air gap layer is provided between the second support member and the display panel.

[11] A transmission display mirror which is a mirror that displays an image in a manner superimposed on a mirror image, including:

the optical structure described in [9]; and a display panel configured to emit image light consisting of linear polarized light to a back surface of the quarter wave plate, in which the second support member is integral with the display panel, the front surface of the second support member is a display surface of the display panel, the display surface outputs the image light consisting of the linear polarized light, and the quarter wave plate has a fast axis and a slow axis tilted at 45° with respect to a polarizing axis of the linear polarized light in a direction in which the linear polarized light is transformed into polarized light Fp.

[13] The transmission display mirror described in [10] or [11] further including a light-shielding plate, in which a back surface of the half-silvered mirror is entirely covered by the display panel covering a center of the back surface of the half-silvered mirror, and the light-shielding plate covering an outer edge of the back surface of the half-silvered mirror.

[13] Use of the optical structure described in any one of [1] to [7], including:

emitting image light consisting of the F polarized light from a back surface side of the second support member and outputting the image light consisting of the F polarized light through the front surface of the first support member to present an image brighter than the mirror image on the front surface of the first support member in a manner superimposed on the mirror image; and darkening the image light to recover the mirror image buried in the image on the front surface of the first support member.

[14] Use of the optical structure described in any one of [1] to [7], including:

emitting the first image light consisting of the F polarized light from a back surface side of the second support member at a tilt with respect to the optical structure and outputting the first image light consisting of the F polarized light through the front surface of the first support member to present the first image on the front surface of the first support member;

further emitting second image light as the external light from the front surface side of the first support member at a tilt with respect to the optical structure to present the second image as the mirror image on the front surface of the second support member; and presenting a bright portion of the second image in a dark portion of the first image and presenting a bright portion of the first image in a dark portion of the second image, on the front surface of the first support member.

[15] The use described in [13] or [14] further including emitting image light consisting of linear polarized light or elliptically polarized light further from a back surface side of a quarter wave plate provided on a back surface side of the selective reflection film to transform the image light into image light consisting of the F polarized light.

[16] A method of producing the optical structure described in any one of [1] to [7], including:

bonding a protection film on which the selective reflection film is stacked, to the front surface of the second support member to form a filter, the protection film, the selective reflection film, and the second support member being sequentially aligned from a front surface toward a back surface in the filter;

overlapping the front surface of the filter and a back surface of the half-silvered mirror with interposition of gas; and fixing the half-silvered mirror and the filter with an attachment so as not to be separate from each other.

According to the present invention, an optical structure including a half-silvered mirror and a selective reflection film in combination can be provided with means suitable for further increasing the reflectance on a front surface side of the half-silvered mirror.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

<Optical Structure>

Figure 1:
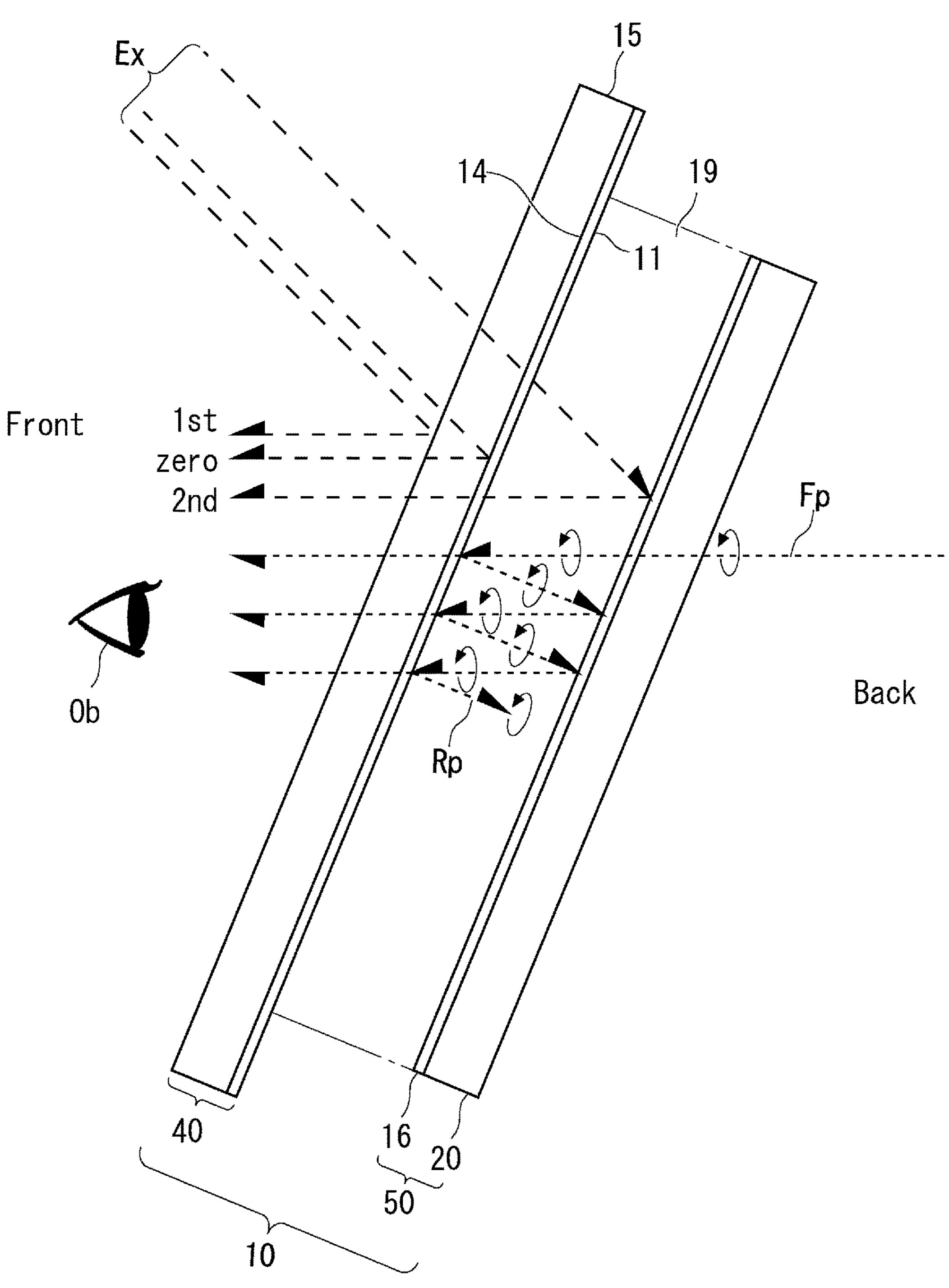
FIG. 1 is a side view of an optical structure.

FIG. 1 shows an optical structure 10 including a half-silvered mirror 40 and a selective reflection film 16 in combination. For the sake of explanation, the half-silvered mirror 40 side shall be a front surface (Front) of the optical structure 10, and the selective reflection film 16 side shall be a back surface (Back) of the optical structure 10. The front surface and the back surface are defined in a standardized manner for constitutional elements in the optical structure 10 and elements to be combined with them. A viewer Ob views the optical structure 10 from its front surface.

<Half-Silvered Mirror>

As shown in FIG. 1, the half-silvered mirror 40 includes a partial reflection film 11 and a transparent first support member 15. The partial reflection film 11 is stacked on the back surface of the first support member 15. The first support member 15 and the partial reflection film 11 are in contact. The first support member 15 exerts a half-silvered mirror function in conjunction with the partial reflection film 11.

In an aspect shown in FIG. 1, the first support member 15 is entirely transparent. In another aspect, the first support member 15 has a transparent region and an opaque region. Circularly polarized light is transmitted through the transparent region. In one aspect, the first support member 15 is flat. In another aspect, the first support member 15 is curved. In one aspect, at least one of the front surface and the back surface of the first support member 15 is flat. In another aspect, at least one of the front surface and the back surface of the first support member 15 is curved.

In one aspect shown in FIG. 1, the first support member 15 is a plate consisting of a transparent substrate. The substrate has a transmittance of 20% or greater and 100% or less throughout the visible light range. In an optical material, light is reflected from the surface, what is called an interface. Therefore, the transmittance of the optical material itself may be called internal transmittance. In addition, the transmittance of the entirety including the interface may be called external transmittance. In the present embodiment, the transmittance shall refer to the external transmittance unless particularly specified. The transmittance is construed similarly in other elements consisting of transparent substrates in the present description.

In one aspect, the first support member 15 has a transmittance of 30% or greater and less than 100%. In one aspect, the transmittance is any of 30, 40, 50, 60, 70, 80, and 90%. The substrate is colorless or colored. The surface of the substrate is smooth. In one aspect, the substrate consists of inorganic glass. In one aspect, the inorganic glass is laminated glass. In another aspect, the substrate consists of plastic. In one aspect, plastic is one of acryl and polycarbonate. In another aspect, the first support member 15 consists of inorganic glass and another member. In the aspect, light is transmitted through a region consisting of the inorganic glass. In the one aspect, the other member is plastic. In the one aspect, the plastic is acryl, polycarbonate, and another plastic.

The partial reflection film 11 shown in FIG. 1 partially transmits light. The partial reflection film 11 partially reflects light. In one aspect, the partial reflection film 11 is a thin film consisting of metal as well as metal oxide and another dielectric. In one aspect, metal is aluminum. In one aspect, the metal oxide contains one of titanium oxide and niobium oxide. In one aspect, the partial reflection film 11 is a single-layer film of metal oxide. In another aspect, the partial reflection film 11 is a dielectric multilayer film. In one aspect, the dielectric multilayer film includes a layer of one of metal oxide and metallic fluoride. The ratio between reflectance and transmittance of the single-layer film of metal oxide or the dielectric multilayer film is easier to adjust than the ratios in other thin films.

In another aspect shown in FIG. 1, the partial reflection film 11 is a metallic thin film. In the one aspect, a transparent protection film is formed as an upper layer on the metallic thin film to protect the metallic thin film. In one aspect, the transparent protection film is an organic thin film. The thickness of the metallic thin film may be designed as appropriate according to a desired transmittance. When a touch panel is disposed on the first support member 15, the metallic thin film provided on the partial reflection film 11 may be utilized as sensor electrodes or a part of the sensor electrodes.

In one aspect shown in FIG. 1, the partial reflection film 11 is formed directly on the back surface of the first support member 15. In another aspect, the thin film is formed on another transparent substrate, and this substrate is laminated to a support member, thereby forming the partial reflection film 11. In one aspect, a transparent adhesive layer is used for laminating.

In one aspect, the transparent adhesive layer consists of an OCA (Optical Clear Adhesive). In one aspect, the OCA is an adhesive sheet that is used for laminating films together and is also film-like itself. Hereinafter, the term "transparent adhesive layer" represents a similar transparent adhesive layer unless particularly specified.

In FIG. 1, the half-silvered mirror 40 transmits part of light, and reflects the remaining portion of light. In one aspect, the reflectance of the half-silvered mirror 40 is higher than the transmittance throughout the visible light range. This reflectance is obtained when other apparatuses such as a filter 50 and a display panel are not disposed on the back surface side of the half-silvered mirror 40.

In one aspect, the reflectance of the half-silvered mirror 40 for light having a wavelength of 550 nm is higher than the transmittance. The reflectance is for light incident on the front surface of the half-silvered mirror 40. In one aspect, the half-silvered mirror 40 has a reflectance of 30% or greater and less than 100% for light having a wavelength of 550 nm. In the one aspect, the reflectance is any of 35, 40, 45, 50, 52, 54, 56, 58, 60, 61, 62, 63, 64, 65, 66, 67, 68, 69, 70, 75, 80, 85, 90, and 95%.

In another aspect of the half-silvered mirror 40 shown in FIG. 1, the transmittance is higher than the reflectance throughout the visible light range. In another aspect, the transmittance of the half-silvered mirror 40 for light having a wavelength of 550 nm is higher than the reflectance. In another aspect, the reflectance of the half-silvered mirror 40 is equal to the transmittance throughout the visible light range. In another aspect, the reflectance of the half-silvered mirror 40 for light having a wavelength of 550 nm is equal to the transmittance. In the present description, the term "half-silvered mirror" is not limited to the one having transmittance and reflectance identical to each other.

In one aspect shown in FIG. 1, an interface 14 is present between the partial reflection film 11 and the first support member 15. The interface 14 reflects external light Ex incident on the front surface of the first support member 15. In one aspect, the inside of the partial reflection film 11 reflects the external light Ex incident on the front surface of the first support member 15. The interface 14 and the partial reflection film 11 present a mirror image on the front surface side of the first support member 15. The viewer Ob views the mirror image from the front surface side of the first support member 15. Unless particularly specified, the "mirror image" in the present embodiment is a mirror image viewed from the front surface side of the first support member 15.

In one aspect shown in FIG. 1, the interface 14 and the inside of the partial reflection film 11 evenly reflect the external light Ex throughout the visible light range. In one aspect, the dielectric multilayer film or the interface 14 thereof evenly reflects the external light Ex throughout the visible light range.

<Air Gap Layer>

As shown in FIG. 1, an air gap layer 19 is provided between the selective reflection film 16 and the partial reflection film 11. In one aspect, the air gap layer 19 consists of a space filled with air. In another aspect, the air gap layer 19 consists of a space filled with gas other than air. In one aspect, the air gap layer 19 is vacuum.

In one aspect shown in FIG. 1, a mirror image generated by reflection of the external light Ex from the partial reflection film 11 shall be a 0-th order image (zero). When the external light Ex is reflected from the interface on the front surface side of the half-silvered mirror 40, a mirror image, that is, a first-order ghost (1st) is generated. In addition, when the external light Ex is reflected from the front surface of the filter 50, a mirror image, that is, a second-order ghost (2nd) is generated. The first-order ghost and the second-order ghost are both darker than the 0-th order image. When the air gap layer 19 is equal to ½ of the thickness of the support member 15, the first-order ghost and the second-order ghost overlap with each other to become brighter. Therefore, the air gap layer 19 preferably has a thickness larger than 0 mm and smaller than ½ of the thickness of the support member 15. In the one aspect, the thickness is larger than 0 mm and smaller than 2.5 mm. In one aspect, the thickness is one of 1 mm and 0.1 mm. In one aspect, the thickness of the air gap layer 19 is reduced to prevent the ghosts from occurring. In addition, an image displayed on the front surface of the optical structure 10, for example, an image consisting of text, is prevented from being blurred by the ghosts.

As shown in FIG. 1, the partial reflection film 11 is exposed to the space that constitutes the air gap layer 19. In one aspect, the partial reflection film 11 consists of a dielectric multilayer film or a metallic film. In this case, even if the partial reflection film 11 is not covered with a protection film, the material that constitutes the partial reflection film 11 is unlikely to be peeled and drop off toward the space that constitutes the air gap layer 19. In addition, the external light Ex is also reflected from the interface between the partial reflection film 11 and the air gap layer 19. The reflectance is higher as the difference between the refractive index of the partial reflection film 11 and the refractive index of the air gap layer 19 is larger.

<Filter and Second Support Member>

As shown in FIG. 1, the optical structure 10 includes the filter 50. The filter 50 includes the selective reflection film 16 and a transparent second support member 20. The second support member 20 is opposed to the first support member 15. The selective reflection film 16 is stacked on the front surface of the second support member 20. The selective reflection film 16 is opposed to the partial reflection film 11 on the back surface side of the half-silvered mirror 40. The second support member 20 may be coupled to the first support member 15. The second support member 20 may form a structure integral with the first support member 15.

In one aspect shown in FIG. 1, the second support member 20 is entirely transparent. In another aspect, the second support member 20 has a transparent region and an opaque region. Circularly polarized light is transmitted through the transparent region. In one aspect, the second support member 20 is flat. In another aspect, the second support member 20 is curved. In one aspect, at least one of the front surface and the back surface of the second support member 20 is flat. In another aspect, at least one of the front surface and the back surface of the second support member 20 is curved.

In one aspect shown in FIG. 1, the second support member 20 is a plate consisting of a transparent substrate. In one aspect, the second support member 20 has a transmittance of 30% or greater and less than 100%. In one aspect, the transmittance is any of 30, 40, 50, 60, 70, 80, and 90%. The substrate is colorless or colored. The surface of the substrate is smooth.

In one aspect, the substrate consists of inorganic glass. In one aspect, the inorganic glass is alkali-free glass. In one aspect, the inorganic glass is soda-lime glass having a low Fe component. The alkali-free glass has more excellent rigidity than soda glass. In one aspect, the inorganic glass is laminated glass. In another aspect, the substrate consists of plastic. In one aspect, plastic is one of acryl and polycarbonate.

In another aspect shown in FIG. 1, the second support member 20 consists of inorganic glass and another member. In the aspect, light is transmitted through a region consisting of the inorganic glass. In the one aspect, the other member is plastic. In the one aspect, the plastic is acryl, polycarbonate, and another plastic.

In one aspect shown in FIG. 1, the second support member 20 has a thickness of 0.3 to 3 mm. The second support member 20 when being thinner than 3 mm equalizes the thickness of the air gap layer 19 as a whole. The second support member 20 when being thicker than 0.3 mm is useful in stably laminating the selective reflection film 16 onto the second support member 20. In one aspect, the second support member 20 has a thickness of 0.5 to 2 mm.

<Selectivity of Transmission and Reflection>

In one aspect shown in FIG. 1, the filter 50 controls transmission and reflection for circularly polarized light. In the present embodiment, left and right circling directions of circularly polarized light are interchanged particularly by reflection from the half-silvered mirror 40 and the filter 50. In the present embodiment, both left-handed circularly polarized light and right-handed circularly polarized light can be utilized. In this case, it is preferable to use a substrate that has a small birefringence like inorganic glass and is optically isotropic, for the second support member 20.

Hereinafter, for the sake of explanation, one of left-handed circularly polarized light and right-handed circularly polarized light will be referred to as F polarized light, and the other will be referred to as R polarized light. If the F polarized light is left-handed circularly polarized light, the R polarized light is right-handed polarized light. The left-handed circularly polarized light is circularly polarized light to be a clockwise helix with respect to a traveling direction of light. The right-handed circularly polarized light is circularly polarized light to be a counterclockwise helix with respect to the traveling direction of light.

As shown in FIG. 1, polarized light Fp is incident on the back surface of the second support member 20. The polarized light Fp is the polarized light F. The polarized light Fp in the drawing is left-handed circularly polarized light. In addition, the polarized light Fp is reflected from the back surface of the partial reflection film 11 to become polarized light Rp. The polarized light Rp is the polarized light R. The polarized light Rp in the drawing is the right-handed circularly polarized light. In another aspect, the polarized light Fp is right-handed circularly polarized light, and the polarized light Rp is left-handed circularly polarized light.

In one aspect shown in FIG. 1, the selective reflection film 16 more readily transmits the polarized light Fp than the polarized light Rp in a broadband in the visible light range. In one aspect, the broadband refers to a bandwidth of at least 150 nm or more in the visible light range and less than the entire visible light range. In one aspect, the broadband refers to bandwidths of 200, 250, 300, 350, 400, and 450 nm. The same applies hereinafter. In one aspect, whether transmission or reflection of the selective reflection film 16 and other optical elements is broadband is determined by the full width at half maximum of a spectrum of transmitted light or reflected light.

In another aspect shown in FIG. 1, the selective reflection film 16 more readily transmits the polarized light Fp than the polarized light Rp throughout the visible light range. In one aspect, the entire visible light range has a wavelength of 400 to 750 nm. In another aspect, the lower limit of the wavelength of visible light is 360 to 400 nm. The upper limit is 760 to 830 nm. The same applies hereinafter. In one aspect, whether transmission or reflection of the selective reflection film 16 and other optical elements is in the entire visible light range is determined by the full width at half maximum of a spectrum of transmitted light or reflected light.

In one aspect shown in FIG. 1, the selective reflection film 16 selectively transmits the polarized light Fp and selectively reflects the polarized light Rp in a broadband in the visible light range. In another aspect, the selective reflection film 16 selectively transmits the polarized light Fp and selectively reflects the polarized light Rp throughout the visible light range. The selective reflection film 16 prevents coloring of light.

In one aspect shown in FIG. 1, the reflectance of the selective reflection film 16 for the polarized light Rp is higher than the reflectance of the partial reflection film 11 for the polarized light Fp in a broadband in the visible light range. In another aspect, the reflectance of the selective reflection film 16 for the polarized light Rp is higher than the reflectance of the partial reflection film 11 for the polarized light Fp throughout the visible light range.

In one aspect shown in FIG. 1, the transmittance of the partial reflection film 11 for the polarized light Fp is higher than the transmittance of the selective reflection film 16 for the polarized light Rp in a broadband in the visible light range. In another aspect, the transmittance of the partial reflection film 11 for the polarized light Fp is higher than the transmittance of the selective reflection film 16 for the polarized light Rp throughout the visible light range.

<Composition of Selective Reflection Film>

In one aspect shown in FIG. 1, the selective reflection film 16 consists of a liquid crystal which is one of a nematic liquid crystal and a smectic liquid crystal. The liquid crystal consists of a phase having chirality. In one aspect, the phase consists of liquid crystal molecules with a chiral dopant added thereto. In another aspect, the phase consists of liquid crystal molecules having chirality. In one aspect, the selective reflection film 16 consists of a cholesteric liquid crystal. In another aspect, the selective reflection film 16 consists of another liquid crystal having cholesteric regularity.

In one aspect, the cholesteric regularity refers to a state in which molecular layers form a spiral structure in which molecules aligned in a single direction form each layer, and adjacent molecular layers have alignment directions slightly shifted from each other. The cholesteric regularity is found in a liquid crystal other than the cholesteric liquid crystal. In one aspect, in order to fix the cholesteric regularity, a liquid crystal phase having cholesteric regularity is fixed. In one aspect, the selective reflection film is a polymer film obtained by curing a cholesteric liquid crystal film.

In another aspect, the liquid crystal is a discotic liquid crystal having a helical axis. In one aspect, by adding a chiral dopant to liquid crystal molecules of a discotic liquid crystal not having a helical axis, the discotic liquid crystal having a helical axis is obtained. In one aspect, the discotic liquid crystal having a helical axis has cholesteric regularity.

The chiral dopant introduced into the above-described liquid crystal molecules induces twist of the liquid crystal molecules to provide an optical rotatory property for the liquid crystal molecules. In one aspect, a helical pitch of a chiral structure of the liquid crystal molecules is variously changed by adjusting the concentration of the chiral dopant. In another aspect, the helical pitch is variously changed by changing the type of the liquid crystal molecules or the chiral dopant.

In one aspect, the liquid crystal phase having cholesteric regularity has a helical axis parallel to a direction normal to the selective reflection film. In one aspect, orientations of helical axes of all of liquid crystal phases having cholesteric regularity are parallel to the direction normal to the selective reflection film. In one aspect, the orientations of helical axes of liquid crystal phases having cholesteric regularity are on average parallel to the direction normal to the selective reflection film.

The liquid crystal having cholesteric regularity has a predetermined helical structure. The helical structure reflects circularly polarized light incident in a direction parallel to the helical axis, the circularly polarized light having the same direction as the circling direction of the helical structure. A clockwise helical structure reflects right-handed circularly polarized light, that is, counterclockwise circularly polarized light. A counterclockwise helical structure reflects left-handed circularly polarized light, that is, clockwise circularly polarized light. Circularly polarized light reflected by the helical structure is the R polarized light described above. Reflection of the R polarized light is called selective reflection.

The helical structure transmits circularly polarized light incident in the direction parallel to the helical axis, the circularly polarized light having a direction opposite to the circling direction of the helical structure. The counterclockwise helical structure transmits right-handed circularly polarized light, that is, counterclockwise circularly polarized light. The clockwise helical structure reflects left-handed circularly polarized light, that is, clockwise circularly polarized light. Circularly polarized light transmitted by the helical structure is the F polarized light described above. The selective reflection film selectively reflects the R polarized light, and conversely, selectively transmits the F polarized light. In one aspect, the selective reflection film transmits light other than circularly polarized light.

In selective reflection, the reflected circularly polarized light has a center wavelength λ represented by the product of the pitch p (μm) in the helical structure and an average refractive index n[av] of the liquid crystal on a plane orthogonal to the helical axis as shown in the following formula (1):

$$\lambda = p \times n[av] \quad \text{(formula (1))}$$

A bandwidth W of wavelengths of the reflection is represented by the product of birefringent anisotropy Δn of the liquid crystal and p as shown in the following formula (2):

$$W = p \times \Delta n \quad \text{(formula (2))}$$

In one aspect shown in FIG. 1, the selective reflection film 16 is a single-layer film. In another aspect, the selective reflection film 16 is a multi-layered film.

In one aspect, the selective reflection film is obtained by stacking a plurality of films having different helical pitches. In one aspect, the films are stacked in the order of helical pitch size. The films having different helical pitches have different selective reflection bands. The bandwidth W of the multi-layered selective reflection film is larger than the bandwidth of the single-layer film. In one aspect, the bandwidth W is broadband. In another aspect, the bandwidth W is the entire visible light range.

In another aspect, the selective reflection film is a single-layer film. The helical pitch size continuously varies in the single-layer film. Alternatively, the orientation of the helical axis continuously varies in the single-layer film. In another aspect, the selective reflection film is obtained by stacking a plurality of single-layer films described above.

<Production of Selective Reflection Film>

In one aspect, the above-described single-layer film is produced using a liquid crystal composition that is curable after being coated. The single-layer film is produced by curing the liquid crystal composition several times while varying a condition for emitting light rays to the liquid crystal composition. In another aspect, the single-layer film is produced by curing the liquid crystal composition several times while varying a liquid crystal alignment condition by heating. In another aspect, coating of the liquid crystal composition and curing of the liquid crystal composition are paired and performed several divided times.

In one aspect, the above-described liquid crystal composition contains liquid crystal molecules of a nematic liquid crystal or a smectic liquid crystal having a polymerizable functional group and a chiral dopant having another polymerizable functional group that polymerizes with the polymerizable functional group. In another aspect, the above-described liquid crystal composition contains liquid crystal molecules of a discotic liquid crystal having a polymerizable functional group and a chiral dopant having another polymerizable functional group that polymerizes with the polymerizable functional group. In another aspect, the above-described liquid crystal composition contains liquid crystal molecules having a polymerizable functional group and liquid crystal molecules not having a polymerizable functional group. In one aspect, liquid crystal molecules before polymerization with the chiral dopant are low-molecular compound or a monomer. In another aspect, liquid crystal molecules before polymerization with the chiral dopant are polymer.

In one aspect, the chiral dopant does not have a polymerizable functional group required for polymerization with the liquid crystal molecules. In one aspect, molecules which are neither the liquid crystal molecules nor the chiral dopant polymerize with the liquid crystal molecules. In another aspect, the above-described liquid crystal composition contains a chiral dopant having a polymerizable functional group required for polymerization with the liquid crystal molecules and a chiral dopant not having the polymerizable functional group.

In one aspect, the liquid crystal composition contains at least any of a solvent, a polymerization initiator, a polymerization inhibitor, an ultraviolet absorber, an oxidation inhibitor, a photo-stabilizer, a horizontal alignment agent, an unevenness preventive agent, a an anti-repelling agent, a plasticizer, and other additives. By adding the plasticizer, the strength of the selective reflection film can be increased. In one aspect, these additives do not affect formation of the liquid crystal phase having cholesteric regularity.

Examples of the photo-stabilizer include hindered amines, and a nickel complex, such as nickel bis(octylphenyl)sulfide, nickel complex-3,5-di-tert-butyl-4-hydroxybenzyl phosphate monoethylate, nickel dibutyl dithiocarbamate, and other nickel complexes. Two or more types of them may be used in combination. The content of a photo-stabilizer in the liquid crystal composition is preferably from 0.01 to 1 part by mass, particularly preferably from 0.1 to 0.3 parts by mass based on the total amount of 100 parts by mass of the liquid crystal molecules.

In one aspect, the polymerization initiator is a photopolymerization initiator or a thermal polymerization initiator. Examples of the photopolymerization initiator include acetophenones, benzophenones, benzoins, benzyls, Michler's ketones, benzoin alkyl ethers, benzyl dimethyl ketals, phosphine oxides, thioxanthones, and other photopolymerization initiators. Examples of the thermal polymerization initiator include azobis-based, peroxide-based, and other thermal polymerization initiators. Two or more types of them may be used in combination. The content of a polymerization initiator in the liquid crystal composition is preferably from 0.01 to 5 mass %, and particularly preferably from 0.03 to 2 mass % based on the total amount of the liquid crystal composition.

In one aspect, the chiral dopant is added to the liquid crystal molecules having a polymerizable functional group. The chiral dopant and the liquid crystal molecules form a liquid crystal phase having a helical axis. Polymerization of the chiral dopant and the liquid crystal molecules fix the liquid crystal phase having a helical axis. The R polarized light is selectively reflected throughout the visible light range.

An example of a method of forming the selective reflection film 16 on the second support member 20 in the filter 50 shown in FIG. 1 will be presented below. First, a liquid crystal composition containing liquid crystal molecules having a polymerizable functional group and a chiral dopant having a polymerizable functional group is applied onto the second support member 20. In one aspect, the content of the chiral dopant is from 1 to 30 mol based on 100 mol of liquid crystal molecules. The coated film is dried to remove the solvent in the liquid crystal composition. By varying a temperature condition in drying, the liquid crystal phase having cholesteric regularity is formed. A polymerization reaction is performed while keeping the cholesteric regularity in the liquid crystal phase. Polymerization is started by applying light or heat to the liquid crystal composition. In one aspect, the temperature during polymerization is lower by 10° C. or more than a phase transition temperature (Tc) between the liquid crystal phase having cholesteric regularity and an isotropic phase. The liquid crystal phase having cholesteric regularity can thereby be stably formed. In one aspect, polymerization is radical polymerization. In another aspect, polymerization is polycondensation. In one aspect of polycondensation, water and another volatile component are produced during polymerization. In another aspect, a byproduct is produced during polymerization. In one aspect, polymerization in which these volatile components and byproduct do not adversely affect properties of the liquid crystal having cholesteric regularity is selected.

In another aspect, liquid crystal molecules of a discotic liquid crystal are polymerized. Polymerization is performed by the method described in Japanese Unexamined Patent Application Publication No. H8-27284, for example.

A light source for use in emitting light to the liquid crystal composition is not particularly restricted. For example, a tungsten lamp, a halogen lamp, a xenon lamp, a xenon flash lamp, a mercury lamp, and another light source can be used.

The liquid crystal composition contains liquid crystal molecules having a polymerizable functional group and a chiral dopant having a polymerizable functional group to be polymerized with the liquid crystal molecules in a total amount of preferably 75 mass % or greater, and more preferably 90 mass % or greater. The liquid crystal composition preferably contains the liquid crystal molecules having a polymerizable functional group in an amount of 75 mass % or greater, and particularly 85 mass % or greater.

In one aspect, the selective reflection film 16 is produced using the liquid crystal composition and the production method described above. In another aspect, a selective reflection film is produced using liquid crystal molecules and production methods described in International Patent Publication No. WO 2010/143683, Japanese Unexamined Patent Application Publication No. 2010-61119, and Japanese Unexamined Patent Application Publication No. 2011-203426.

<Multiple Reflection>

In FIG. 1, the selective reflection film 16 transmits a large portion of the polarized light Fp. The partial reflection film 11 reflects a portion of the polarized light Fp as the polarized light Rp. The polarized light Rp has a reversed circling direction of circularly polarized light with respect to the polarized light Fp. The partial reflection film 11 transmits the remaining portion of the polarized light Fp. The selective reflection film 16 reflects a large portion of the polarized light Rp as the polarized light Fp. The polarized light Fp has a reversed circling direction of circularly polarized light with respect to the polarized light Rp. Thereafter, multiple reflection occurs between the partial reflection film 11 and the selective reflection film 16.

In multiple reflection shown in FIG. 1, circularly polarized light interchanges the circling directions each time reflection is performed. The polarized light Fp is incident on the back surface of the partial reflection film 11. The polarized light Rp is incident on the front surface of the selective reflection film 16. As described above, the transmittance of the partial reflection film 11 for the polarized light Fp is higher than the transmittance of the selective reflection film 16 for the polarized light Rp. Thus, circularly polarized light is preferentially output from the partial reflection film 11 side while repeating multiple reflection. The selective reflection film 16 transforms the polarized light Rp returned by the partial reflection film 11 to the back surface side into the polarized light Fp and reflects the polarized light Fp, thereby returning the polarized light Fp back to the front surface side. Therefore, the selective reflection film 16 strengthens light output to the front surface side.

In one aspect shown in FIG. 1, the transmittance of the partial reflection film 11 for the polarized light Fp and the transmittance of the selective reflection film 16 for the polarized light Rp are appropriately designed. In this case, the total of the transmittance for the polarized light Fp and the reflectance for the external light Ex in the optical structure 10 exceeds 100% as viewed from a viewer who views the optical structure 10 from its front surface.

In one aspect shown in FIG. 1, the partial reflection film 11 has poor selectivity with respect to the circling orientation of circularly polarized light. In one aspect, the partial reflection film 11 is a film having a character that selectively reflects neither the polarized light Fp nor the polarized light Rp. In one aspect, the partial reflection film 11 is a film having a character that reflects both the polarized light Fp and the polarized light Rp at the same reflectance. In one aspect, the partial reflection film 11 is a film having a character that transmits both the polarized light Fp and the polarized light Rp at the same transmittance.

In one aspect shown in FIG. 1, a larger amount of the polarized light Fp than the polarized light Rp is incident on the back surface of the partial reflection film 11 having such poor selectivity. In one aspect, the selective reflection film 16 generates a deviation in the circling direction of circularly polarized light incident on the partial reflection film 11. In one aspect, the light source generates a deviation in the circling direction of circularly polarized light incident on the partial reflection film 11. In one aspect, the light source outputs circularly polarized light to be transmitted through the selective reflection film 16.

<Second Support Member and Air Gap Layer>

In FIG. 1, the selective reflection film 16 consisting of liquid crystal molecules is fragile by itself. The selective reflection film 16 is difficult to stand on its own by itself. The optical structure 10 requires a support member that supports the selective reflection film 16. Herein, the air gap layer 19 is present between the first support member 15 and the selective reflection film 16. Therefore, the first support member 15 cannot effectively support the selective reflection film 16 from the front surface side of the selective reflection film 16. Thus, instead of the first support member 15, the second support member 20 supports the selective reflection film 16 from the back surface side of the selective reflection film 16.

As shown in FIG. 1, the first support member 15 and the second support member 20 stably maintain the interval between the partial reflection film 11 and the selective reflection film. Therefore, these support members prevent the air gap layer 19 from being squashed. In one aspect, the partial reflection film 11 and the selective reflection film 16 are parallel all over the region to which they are opposed. These support members can prevent an interference fringe from occurring by making the partial reflection film 11 and the selective reflection film 16 more parallel.

As explained above, in FIG. 1, the second support member 20 assists the air gap layer 19 further increasing the reflectance on the front surface side of the half-silvered mirror 40. The second support member 20 assists the air gap layer 19 brightening a mirror image viewed from the front surface side of the half-silvered mirror 40.

<Transmission Display Mirror>

Figure 2:
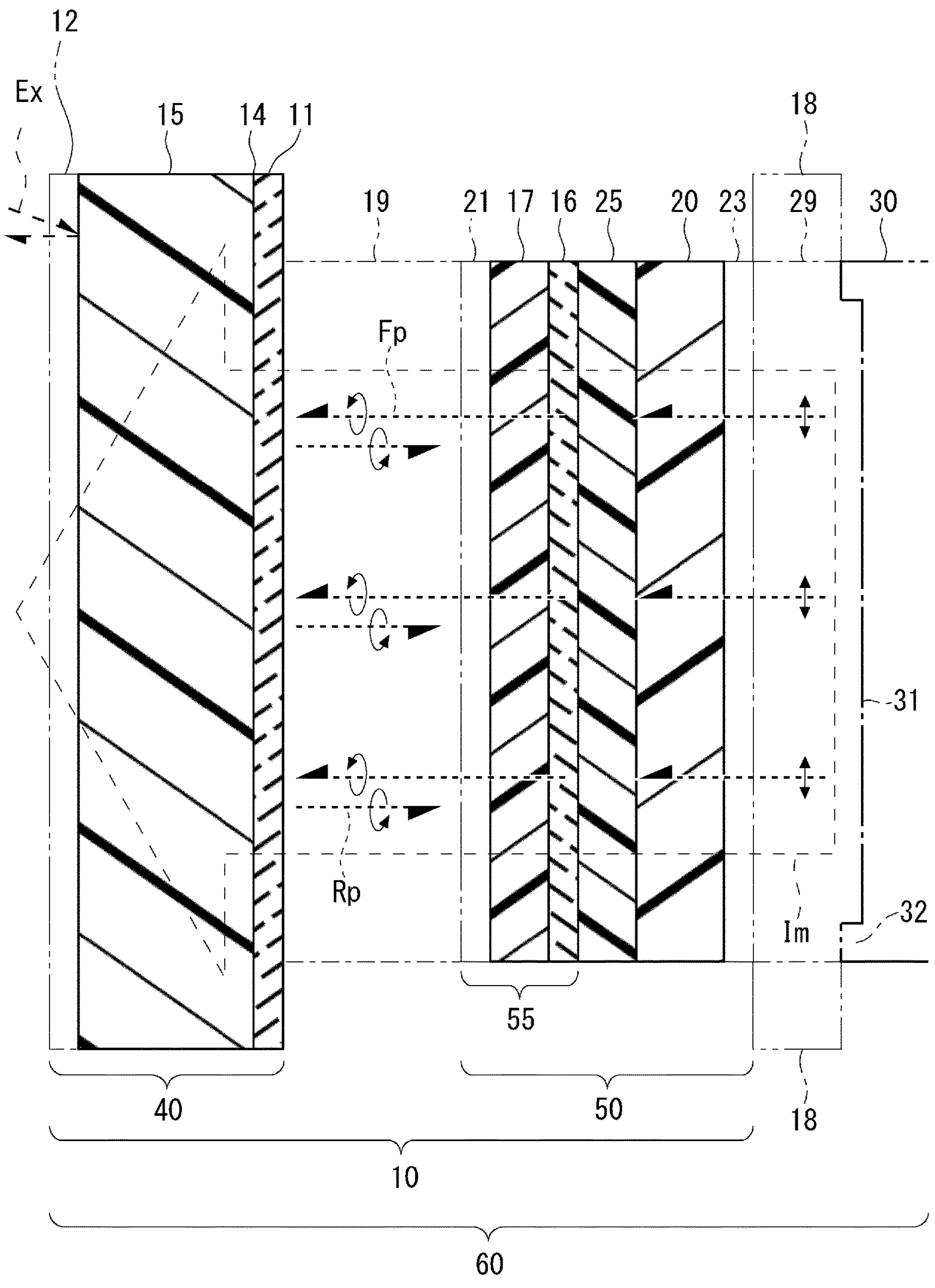
FIG. 2 is a cross-sectional view of an optical structure of Example 1.

Using FIG. 2, a utilization example of the optical structure 10 is shown. The drawing shows a transmission display mirror 60 including the optical structure 10 and a display panel 30. The transmission display mirror 60 is a mirror that displays an image on its front surface side in a manner superimposed on a mirror image. In one aspect, the image includes at least one of a moving image and a still image. In one aspect, the transmission display mirror 60 is a mirror display that achieves a mirror property and a display property in an identical region.

As shown in FIG. 2, the display panel 30 is arranged on the back surface side of the optical structure 10. The display panel 30 has a display surface 31 on its front surface. The display surface 31 is opposed to the back surface of the second support member 20. In one aspect, the optical structure 10 totally covers the entire display surface 31. The display surface 31 outputs image light Im consisting of linear polarized light. The display surface 31 emits the image light Im to the back surface of the second support member 20. An image the image light Im has is viewed from the front surface side of the optical structure 10 as a transmission image.

<Protection of Selective Reflection Film, and Stack>

In one aspect shown in FIG. 2, a stack 55 is stacked on the second support member 20. The stack 55 includes a protection film 17 and the selective reflection film 16. The selective reflection film 16 is stacked on the protection film 17. In one aspect, the selective reflection film 16 is laminated to the back surface of the protection film 17 with interposition of a transparent adhesive layer not shown. In the one aspect, the transparent adhesive layer contains an ultraviolet absorber. The ultraviolet absorber protects the selective reflection film 16 against ultraviolet rays included in external light.

In one aspect shown in FIG. 2, the selective reflection film 16 is located on the back surface of the protection film 17. The protection film 17 covers the front surface of the selective reflection film 16. In an aspect different from the aspect shown in the drawing, the selective reflection film 16 is located on the front surface of the protection film 17. The protection film 17, the selective reflection film 16, and the second support member 20 are sequentially aligned from the front surface toward the back surface in the filter 50.

In one aspect shown in FIG. 2, the protection film 17 is located between the selective reflection film 16 and the partial reflection film 11. In one aspect, the protection film 17 functions as a protection layer for the selective reflection film 16. In one aspect, the protection film 17 consists of a material having a small birefringence. In one aspect, the protection film 17 consists of a material having a birefringence smaller than that of PET (polyethylene terephthalate). In one aspect, the protection film 17 is a TAC (triacetylcellulose) film. In one aspect, the protection film 17 has a thickness of 20 to 100 μm. In one aspect, the protection film 17 has a thickness of any of 30, 40, 50, 60, 70, and 80 μm.

In one aspect shown in FIG. 2, the filter 50 is formed by laminating the stack 55 to the front surface of the second support member 20. In one aspect, a transparent adhesive layer is used for laminating. In the drawing, a quarter wave plate 25 is provided on the front surface of the second support member 20. Therefore, the filter 50 is formed by laminating the stack 55 on the quarter wave plate 25. The quarter wave plate 25 will be described later.

The air gap layer 19 is formed by overlapping the front surface of the filter 50 and the back surface of the half-silvered mirror 40 with interposition of gas. In one aspect, the half-silvered mirror 40 and the filter 50 are fixed to each other with an attachment not shown so as not to separate from each other. In one aspect, the attachment is attached to peripheral edges of the half-silvered mirror 40 and the filter 50.

In one aspect shown in FIG. 2, an antireflection film 21 is further provided on the protection film 17. The antireflection film 21 is located on the front surface of the protection film 17. The antireflection film 21 is exposed to the space that constitutes the air gap layer 19. The antireflection film 21 promotes transmission of the polarized light Fp and the polarized light Rp through the interface between the stack 55 and the air gap layer 19. In a preferable aspect, the transmittance for polarized light is improved by 1.5 to 2.0 points. The antireflection film 21 also prevents reflection of the polarized light Fp and the polarized light Rp from the interface between the stack 55 and the air gap layer 19. In another aspect, the antireflection film is not provided on the front surface of the protection film 17. In the case of not providing the antireflection film, the reflectance for the external light Ex on the front surface side of the optical structure 10 is improved as compared with the case of providing the antireflection film. In a preferable aspect, the reflectance is improved by 0.5 point.

<Introduction of Quarter Wave Plate>

As shown in FIG. 2, the quarter wave plate 25 is provided on the second support member 20. The quarter wave plate 25 is located on the front surface of the second support member 20. In one aspect, the quarter wave plate 25 is laminated to the second support member 20 with a transparent adhesive layer.

As shown in FIG. 2, the quarter wave plate 25 is located on the back surface of the stack 55. In one aspect, the stack 55 is laminated to the quarter wave plate 25 with a transparent adhesive layer. The quarter wave plate 25 is located between the selective reflection film 16 and the second support member 20. The selective reflection film 16 is located between the air gap layer 19 and the quarter wave plate 25.

As shown in FIG. 2, the image light Im consisting of linear polarized light is emitted further from the back surface side of the quarter wave plate 25 provided on the back surface side of the selective reflection film 16. In one aspect, the quarter wave plate 25 has a fast axis or a slow axis tilted at 45° with respect to the polarizing axis of the image light Im consisting of linear polarized light. The direction of tilt is a direction in which the image light Im consisting of linear polarized light is transformed into the image light Im consisting of the polarized light Fp.

The display panel 30 shown in FIG. 2 is any of a liquid crystal display, an organic EL (Electro Luminescence) display, and other displays. In one aspect, the display panel 30 is a flat display panel. The liquid crystal display has any of a TN (Twisted Nematic) method, an IPS (In Plane Switching) method, a VA (Vertical Alignment) method, and other display methods.

In one aspect shown in FIG. 2, the display panel 30 is a TN-type liquid crystal display. In the one aspect, the polarizing axis of the linear polarized light is tilted at 45 degrees with respect to the vertical direction of the screen. Thus, the fast axis of the quarter wave plate 25 is not tilted with respect to the vertical direction of the screen, that is, is tilted at 0 degree, or tilted at 90 degrees.

In another aspect shown in FIG. 2, the display panel 30 is an IPS-type or a VA-type liquid crystal display. In the one aspect, the polarizing axis of the linear polarized light is not tilted with respect to the vertical direction of the screen, that is, is tilted at 0 degree, or tilted at 90 degrees. Thus, the fast axis of the quarter wave plate 25 is tilted at 45 degrees with respect to the vertical direction of the screen.

In an aspect different from the aspect shown in FIG. 2, the display surface 31 outputs the image light Im consisting of elliptically polarized light. The fast axis or the slow axis of the quarter wave plate 25 is tilted at a predetermined angle with respect to the polarizing axis of the image light Im consisting of elliptically polarized light. The direction of tilt is a direction in which the image light Im consisting of elliptically polarized light is transformed into the image light Im consisting of the polarized light Fp. The magnitude of tilt is an angle at which the image light Im consisting of elliptically polarized light is transformed into the image light Im consisting of the polarized light Fp.

<Air Gap Layer on Display Panel Side>

In one aspect shown in FIG. 2, an air gap layer 29 is provided between the display surface 31 and the back surface of the second support member 20. In one aspect, the air gap layer 29 consists of a space filled with air. In one aspect, water vapor has been eliminated from air. In another aspect, the air gap layer 29 consists of a space filled with gas other than air. In one aspect, the air gap layer 29 is vacuum. In another aspect, the filter 50 and the display panel 30 are laminated with interposition of a transparent adhesive layer.

In one aspect shown in FIG. 2, a bezel 32 of the display panel 30 is located on the peripheral edge of the display surface 31. The bezel 32 is higher than the display surface 31 toward the front surface side. By placing the filter 50 on the bezel, the air gap layer 29 having a thickness equal to the height of the bezel is obtained. In one aspect, the air gap layer 29 has a thickness of 0.01 mm to 10 mm. In one aspect, the air gap layer 29 has a thickness of 0.1 to 6 mm. In one aspect, the air gap layer 29 has a thickness of 10 mm or less in order to make the transmission display mirror 60 thinner.

<Antireflection for Back Surface of Filter>

In one aspect shown in FIG. 2, an antireflection film 23 is provided on the second support member 20. The antireflection film 23 is located on the back surface of the second support member 20. The antireflection film 23 is exposed to a space that constitutes the air gap layer 29. The antireflection film 23 promotes transmission of the image light Im through an interface between the filter 50 and the air gap layer 29, and prevents reflection of the image light Im from the interface. The antireflection film 23 increases luminance of the image light Im viewed on the front surface side of the transmission display mirror 60.

In one aspect shown in FIG. 2, a base film with the antireflection film 23 formed thereon is laminated to the back surface of the second support member 20. The back surface of the antireflection film 23 is in contact with the air gap layer 29. The antireflection film 23 is provided on the back surface of the base film. The back surface of the second support member 20 is located on the front surface of the base film. In one aspect, the antireflection layer 23 is a thin film formed on the back surface of the filter 50. In one aspect, the antireflection layer 23 is a thin film formed on the back surface of the support member 20, that is, the interface with the air layer 29.

<Light Shielding of Outer Edge of Back Surface of Half-Silvered Mirror 40>

In one aspect shown in FIG. 2, a light-shielding plate 18 is arranged between the filter 50 and the display panel 30. In one aspect, the light-shielding plate 18 surrounds the outer edge of the air gap layer 29. In one aspect, the display panel 30 covers the center of the optical structure 10. In one aspect, the display panel 30 covers the center of the half-silvered mirror 40.

In one aspect shown in FIG. 2, the display panel 30 covers the center of the filter 50. In one aspect, the light-shielding plate 18 covers the outer edge of the optical structure 10. In one aspect, the light-shielding plate 18 covers the outer edge of the half-silvered mirror 40. In one aspect, the light-shielding plate 18 covers the outer edge of the filter 50.

In one aspect shown in FIG. 2, the light-shielding plate 18 covers the entire back surface of the optical structure 10 in conjunction with the display panel 30. In one aspect, the light-shielding plate 18 covers the entire back surface of the half-silvered mirror 40 in conjunction with the display panel 30. In one aspect, the light-shielding plate 18 covers the entire back surface of the filter 50 in conjunction with the display panel 30.

In one aspect shown in FIG. 2, the light-shielding plate 18 makes a color tone of a mirror image on the outer edge of the half-silvered mirror 40 closer to a color tone of a mirror image at the center of the half-silvered mirror 40 covered by the display panel 30. The mirror image as referred to herein is a mirror image as viewed from the front surface of half-silvered mirror. In one aspect, a plate with its front surface or back surface painted black is used as the light-shielding plate 18. In another aspect, a plate with a black film laminated to its front surface or back surface is used as the light-shielding plate 18. In another aspect, the thin plate is metal, glass, or resin. In another aspect, the entire light-shielding plate 18 consists of black resin. In one aspect, the peripheral edge of the back surface of the filter 50 is shielded from light by painting instead of not using the light-shielding plate 18. In one aspect, the back surface of the support member 20, that is, the interface with the air layer 29 is shielded from light by painting. In one aspect, painting is performed in black.

<Antireflection on Front Surface Side of First Support Member>

In one aspect shown in FIG. 2, an antireflection film 12 may further be provided on the first support member 15. The antireflection film 12 is located on the front surface of the first support member 15. The antireflection film 12 is exposed to a space on the front surface of the first support member 15. The antireflection film 12 promotes transmission of the external light Ex through the interface on the front surface of the first support member 15, and prevents reflection of the external light Ex from the interface. The antireflection film 12 prevents double mirror images from occurring at the interface 14 and the interface on the front surface of the first support member 15.

<Use of Transmission Display Mirror>

The transmission display mirror 60 shown in FIG. 2 is used as described below. First, the display panel 30 emits the image light Im to the back surface side of the second support member 20. Next, the quarter wave plate 25 transforms the image light Im into image light consisting of the polarized light Fp. The partial reflection film 11 transmits the image light Im emitted from the back surface side. The image light Im consisting of the polarized light Fp is output through the front surface of the first support member 15. Therefore, the half-silvered mirror 40 exerts a display property.

In FIG. 2, the partial reflection film 11 reflects the external light Ex emitted through the front surface. Therefore, the half-silvered mirror 40 exerts a mirror property. In one aspect, the interface 14, the inside of the partial reflection film 11, and the interface between the partial reflection film 11 and the air gap layer 19 reflect the external light Ex. In another aspect, the selective reflection film 16 further reflects the external light Ex.

In one aspect shown in FIG. 2, the reflectance of the transmission display mirror 60 for light having a wavelength of 550 nm is 30% or greater and less than 100%. The reflectance is for light incident on the front surface of the transmission display mirror 60. The reflectance is settled considering each element located on the back surface of the half-silvered mirror 40. In one aspect, the reflectance is any of 35, 40, 45, 50, 52, 54, 56, 58, 60, 61, 62, 63, 64, 65, 66, 67, 68, 69, 70, 75, 80, 85, 90, and 95%.

In FIG. 2, the image light Im is brighter than the external light Ex when being viewed by a viewer from the front surface of the first support member 15. The transmission display mirror 60 presents an image brighter than the mirror image on the front surface of the first support member 15 in a manner superimposed on the mirror image. The transmission display mirror 60 causes the image to emerge on the mirror as if on the "Magic Mirror" in the story of "Snow White". Further, the transmission display mirror 60 darkens the image light Im to be emitted to the back surface side of the second support member 20, thereby recovering the mirror image buried in the image presented on the front surface of the first support member 15.

<Variation of Filter>

Figure 3:
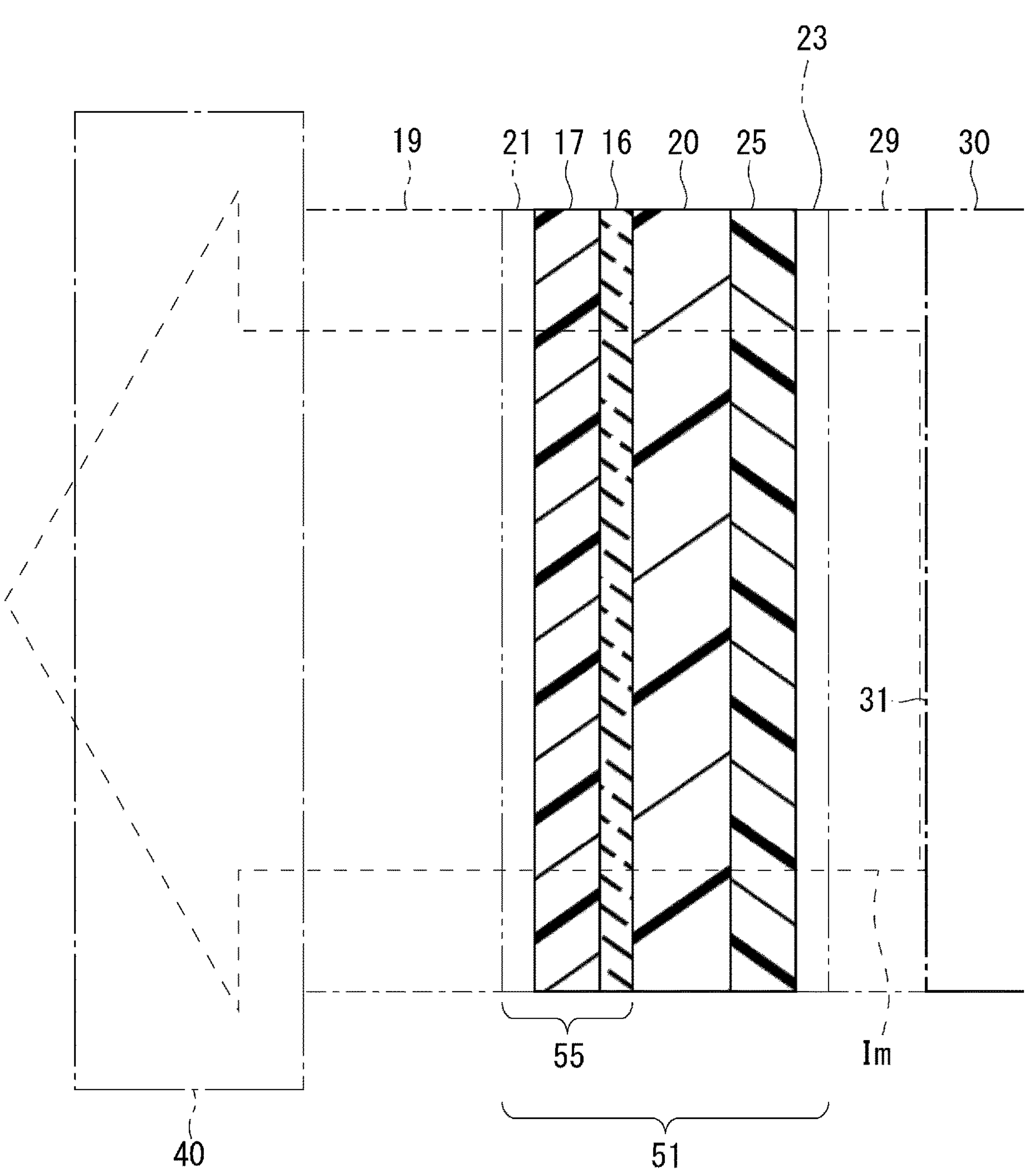
FIG. 3 shows a variation of a filter of Example 1.

In one aspect of the filter 50 shown in FIG. 2, the quarter wave plate 25 is located between the selective reflection film 16 and the second support member 20. FIG. 3 shows a cross section of a filter 51 which is a variation of the filter 50 depicted in FIG. 2. In the filter 51, the quarter wave plate 25 is located on the back surface of the second support member 20. In one aspect, the quarter wave plate 25 is laminated to the second support member 20. In one aspect, lamination is performed with a transparent adhesive layer.

In one aspect shown in FIG. 3, the stack 55 is located on the front surface of the second support member 20. In one aspect, the stack 55 is laminated to the second support member 20 with a transparent adhesive layer. The second support member 20 is located between the selective reflection film 16 and the quarter wave plate 25. In other words, the quarter wave plate 25 is located on the opposite side of the selective reflection film 16 with interposition of the second support member 20. In addition, the quarter wave plate 25 is located between the second support member 20 and the air gap layer 29.

In one aspect shown in FIG. 3, the antireflection film 23 is located on the back surface of the quarter wave plate 25. The antireflection film 23 is exposed to a space that constitutes the air gap layer 29. The antireflection film 23 promotes transmission of the image light Im through the interface between the filter 50 and the air gap layer 29, and prevents reflection of the image light Im from the interface.

In one aspect shown in FIG. 3, a base film with the antireflection film 23 formed thereon is laminated to the back surface of the quarter wave plate 25. The antireflection film 23 is located on the back surface of the base film. The back surface of the quarter wave plate 25 is located on the front surface of the base film.

In an aspect different from the aspect shown in FIG. 3, the quarter wave plate 25 is arranged at a remote position on the back surface side of the second support member 20. In another aspect, the quarter wave plate 25 is provided on the display surface 31. In the one aspect, the quarter wave plate 25 is laminated onto the display surface 31.

<Variation of Transmission Display Mirror>

Figure 4:
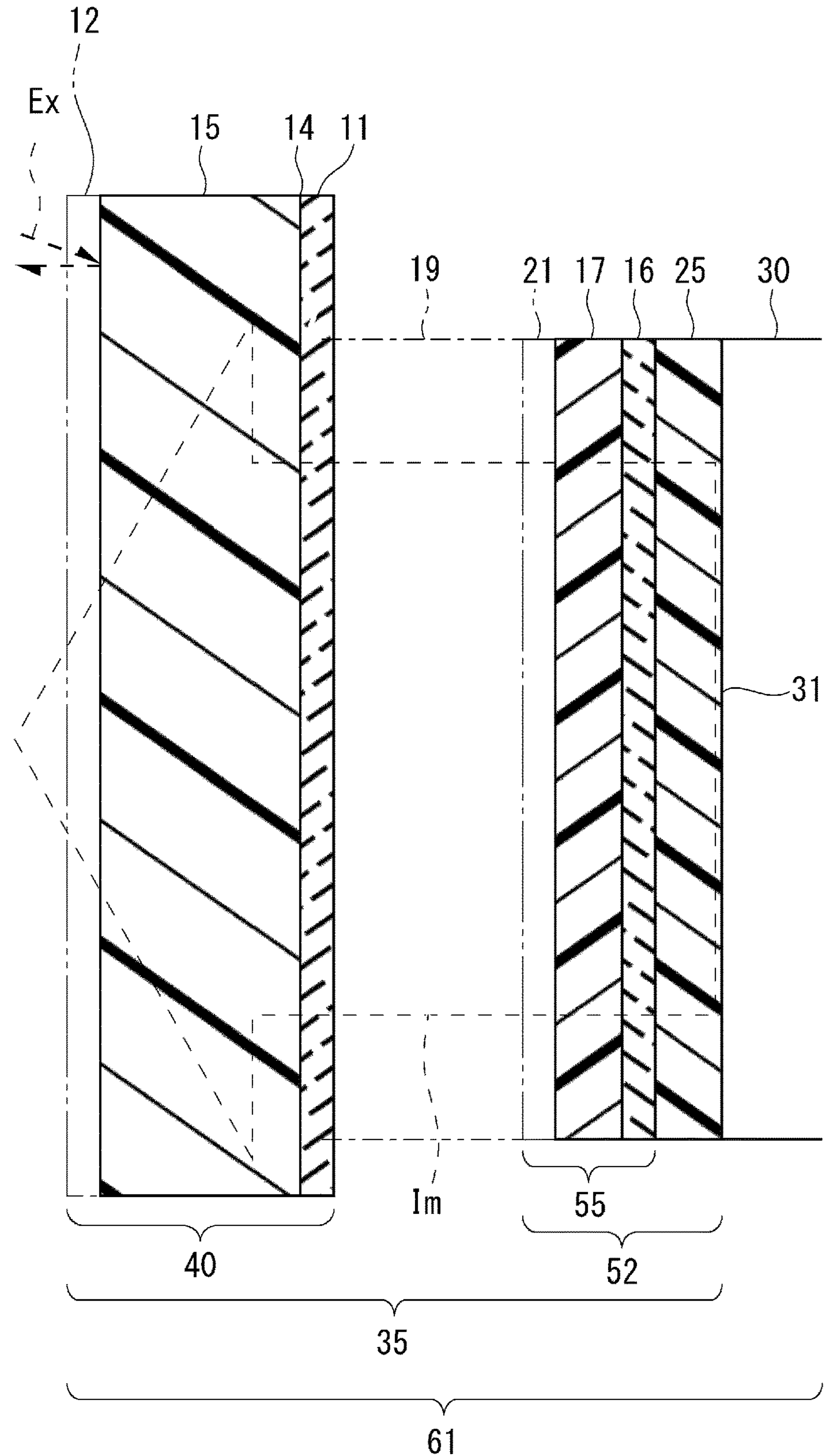
FIG. 4 shows a variation of a transmission display mirror of Example 1.

In one aspect of the transmission display mirror 60 shown in FIG. 2, the filter 50 includes the second support member 20. In addition, the second support member 20 supports the quarter wave plate 25. FIG. 4 shows a cross section of a transmission display mirror 61 which is a variation of the transmission display mirror 60 depicted in FIG. 2. The transmission display mirror 61 includes a filter 52 which is a variation of the filter 50 depicted in FIG. 2. The transmission display mirror 61 includes an optical structure 35 which is a variation of the optical structure 10 depicted in FIG. 2.

In one aspect shown in FIG. 4, the protection film 17, the selective reflection film 16, and the quarter wave plate 25 are sequentially aligned from the front surface toward the back surface in the filter 52. In one aspect, the back surface of the filter 52 is laminated onto the display surface 31. In one aspect, the filter 52 is formed by laminating the quarter wave plate 25 and further laminating the stack 55 to the display surface 31. In one aspect, a transparent adhesive layer is used to laminate them.

In one aspect shown in FIG. 4, the filter 52 does not have the second support member. From another perspective, the display panel 30 supports the filter 52 instead of the second support member. From another perspective, the second support member is integral with the display panel 30, and further, the display surface 31 serves as the front surface of second support member.

In one aspect shown in FIG. 4, the display surface 31 outputs the image light Im. The display panel 30 emits the image light Im to the back surface of the quarter wave plate 25. The fast axis and the slow axis of the quarter wave plate 25 are tilted at 45° with respect to the polarizing axis of the image light Im consisting of linear polarized light in the direction in which the image light Im consisting of linear polarized light is transformed into the polarized light Fp.

In an aspect different from the aspect shown in FIG. 4, the quarter wave plate 25 is incorporated in the display panel 30. The quarter wave plate generates the image light Im consisting of the polarized light Fp from the image light consisting of linear polarized light. In the aspect, the display surface 31 outputs the image light Im consisting of the polarized light Fp rather than the linear polarized light. In the one aspect, no quarter wave plate is provided between the display surface 31 and the selective reflection film 16.

Example 1: Transmission Display Mirror Including Second Support Member

Referring again to FIG. 2, an example of production of the transmission display mirror 60 will be shown below. See Table 1 below. A glass plate having a thickness of 3 mm was used as the first support member 15. The reflectance of the half-silvered mirror 40 when viewed from the front surface was 64%. At this time, other apparatuses such as the filter 50 and the display panel 30 were not arranged.

In the filter 50 shown in FIG. 2, a TAC film having a thickness of 80 μm was used as the protection film 17. A glass plate having a thickness of 3 mm was used as the second support member 20. The selective reflection film 16 was formed by stacking a film, which hereinafter will be called a liquid crystal film, in which liquid crystal molecules have an array of a helical structure on the back surface of the protection film 17. The liquid crystal film was first formed on a base film consisting of PET having a thickness of 100 μm. This liquid crystal film was laminated to a quarter wave plate with a transparent adhesive layer. The transparent adhesive layer may be formed on a release film. The transparent adhesive layer may have a thickness of 25 μm.

The same applies hereinafter. A stack consisting of the liquid crystal film and the quarter wave plate was laminated to the glass plate with another transparent adhesive layer. Further, the TAC film was laminated to the stack consisting of the liquid crystal film, the quarter wave plate, and the support member with another transparent adhesive layer. As described above, the filter 50 including the protection film 17, the selective reflection film 16, the quarter wave plate 25, and the second support member 20 from the front surface side was obtained.

In the filter 50 shown in FIG. 2, the antireflection film 23 made of an inorganic thin film is further formed on the back surface side of the second support member 20. The antireflection film 23 was the outermost layer of the filter 50 on the back surface side. Note that in the present example, the antireflection film 21 shown in FIG. 2 was not used. The front surface of the protection film 17 and the back surface of the partial reflection film 11 were directly opposed with interposition of the air gap layer 19.

In another aspect for providing the selective reflection film 16 consisting of the liquid crystal film in the filter 50, a transparent adhesive layer is first stacked on the TAC film. Next, the liquid crystal film is laminated to the transparent adhesive layer together with the base film. The base film is peeled to expose the liquid crystal film on the TAC film. A transparent adhesive layer is stacked on the liquid crystal film. The quarter wave plate is laminated to another transparent adhesive layer. Still another transparent adhesive layer is stacked on the quarter wave plate. The stack consisting of the TAC film, the liquid crystal film, and the quarter wave plate is laminated to the front surface of the support member 20 with the transparent adhesive layer.

The optical structure 10 was obtained by overlapping the filter 50 on the back surface side of the half-silvered mirror 40 shown in FIG. 2. The transmission display mirror 60 was obtained by overlapping the display panel 30 on the back surface side of the optical structure 10. The air gap layer 29 was implemented by an air layer. The image light Im consisting of linear polarized light was emitted through the display surface 31 of the display panel 30 to the back surface of the optical structure 10. The image light Im caused an image consisting of white text on a black background to be displayed. Visibility of the text from the front surface side of the transmission display mirror 60 was good.

Next, the image light Im shown in FIG. 2 was darkened to cause the display surface 31 to display only the black background. The reflectance when the transmission display mirror 60 was viewed from the front surface was 70%. It was suggested that in the transmission display mirror 60, the filter 50 did not affect but rather improved the mirror property of the half-silvered mirror 40.

Example 2: Addition of Antireflection Layer and Light-Shielding Plate

In FIG. 2, the antireflection layer 21 was provided on the protection film 17. The light-shielding plate 18 was provided on the transmission display mirror 60. The remaining points were similar to Example 1. See Table 1 below. The brightness of a display image slightly increased, and a good mirror property was obtained on the entire surface of the half-silvered mirror 40. When the light-shielding plate 18 was not provided, the mirror property degraded on the peripheral edge of the half-silvered mirror 40.

Example 3: Transmission Display Mirror not Including Antireflection Film

The transmission display mirror 60 of the present example was produced by using a half-silvered mirror having a reflectance lower than the reflectances of Example 1 and Example 2 as the half-silvered mirror 40 shown in FIG. 2. A glass plate having a thickness of 4 mm was used as the first support member 15. A glass plate having a thickness of 1.3 mm was used as the second support member 20. See Table 1 below for the remaining composition. The reflectance of the half-silvered mirror when the half-silvered mirror alone was viewed from the front surface was 50%. The antireflection films 21 and 23 were not provided on the front surface and the back surface of the filter 50. The display panel 30 was overlapped on the back surface side of the filter 50.

The image light Im was emitted to the back surface of the transmission display mirror 60 as shown in FIG. 2. An image consisting of white text on a black background was displayed on the front surface of the transmission display mirror 60. Visibility of the text from the front surface side of the transmission display mirror 60 was good. The text was brighter than the text viewed in Example 1.

Only a black background was displayed on the display surface 31 shown in FIG. 2. When the transmission display mirror 60 was viewed from the front surface, the reflectance was 62%. It was suggested that in the transmission display mirror 60 of the present example, the filter 50 did not affect but rather improved the mirror property of the half-silvered mirror 40.

Example 4: Transmission Display Mirror Not Including Second Support Member

Figure 5:
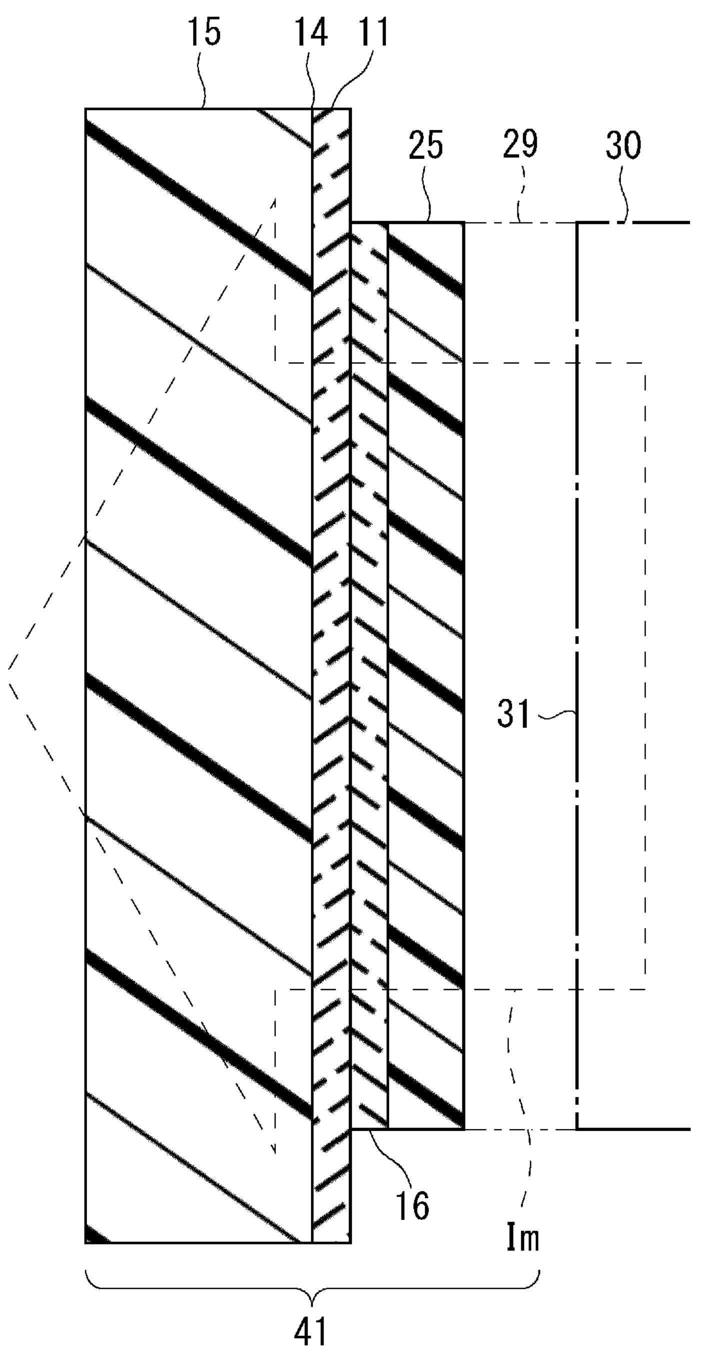
FIG. 5 is a cross-sectional view of a half-silvered mirror of Example 4.

As shown in FIG. 5, a light reflecting and transmitting member 41 was produced. See Table 1 below. The partial reflection film 11 was stacked on the back surface of the first support member 15 consisting of a glass plate having a thickness of 5 mm. Similarly to Example 1, a liquid crystal film was laminated to a quarter wave plate with a transparent adhesive layer. Further, a stack consisting of the liquid crystal film and the quarter wave plate was laminated to the back surface of the partial reflection film 11 with a transparent adhesive layer. The light reflecting and transmitting member 41 sequentially including the first support member 15, the partial reflection film 11, the selective reflection film 16, and the quarter wave plate 25 from the front surface side was thereby obtained. The light reflecting and transmitting member 41 does not include the second support member.

As shown in FIG. 5, a transmission display mirror was obtained by overlapping the display panel 30 on the back surface of the light reflecting and transmitting member 41 with interposition of the air gap layer 29 consisting of an air layer. By emitting the image light Im to the back surface of the light reflecting and transmitting member 41, an image identical to the above-described image was displayed on the transmission display mirror. Visibility of text in the image was good.

Next, the image light Im was darkened to cause the display surface 31 to display only a black background. The reflectance when the transmission display mirror was viewed from the front surface was 63%. It was suggested that in the transmission display mirror of the present example, the selective reflection film 16 alone not stacked on the second support member does not contribute to improvement of the mirror property of the light reflecting and transmitting member 41.

Figure 6:
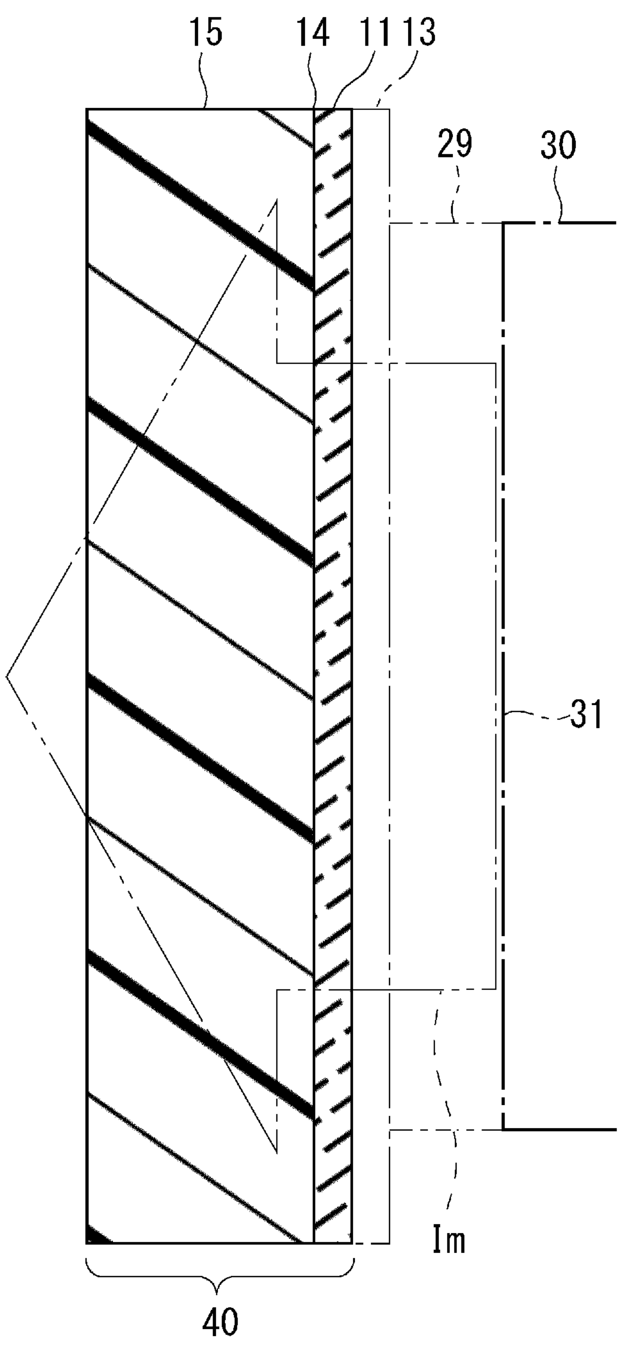
FIG. 6 is a cross-sectional view of a half-silvered mirror of Example 5.

Example 5: Transmission Display Mirror not Including Selective Reflection Film As shown in FIG. 6, a transmission display mirror was produced using only the half-silvered mirror 40 used in Example 1 described above. See Table 1 below. The partial reflection film 11 of the half-silvered mirror 40 was opposed to the display surface 31. By emitting the image light Im to the back surface of the half-silvered mirror 40, an image identical to the above-described image was displayed on the transmission display mirror. Luminance of text in the image was lower than in Example 1, Example 2, and Example 4. In addition, visibility of the text was lower than in Example 1, Example 2, and Example 4.

Next, the image light Im shown in FIG. 6 was darkened to cause the display surface 31 to display only a black background. The reflectance when the transmission display mirror was viewed from the front surface was 64%. It was therefore suggested that high reflectance was obtained in the transmission display mirror of Example 1 because the selective reflection film was stacked on the second support member.

Example 6: Half-Silvered Mirror Including Antireflection Film

The half-silvered mirror 40 of Example 5 shown in FIG. 6 was subjected to processing. See Table 1 below. An antireflection film 13 was further provided on the back surface of the partial display film 11. An antireflection film formed on a base film was used. A surface opposite to the antireflection film with interposition of the base film was laminated to the back surface of the partial display film 11. Lamination was performed with interposition of a transparent adhesive layer. In the present example, a display panel was not provided on the back surface side of the half-silvered mirror 40. The reflectance when the half-silvered mirror 40 was viewed from the front surface of the half-silvered mirror 40 was 53%. This reflectance is the reflectance of the half-silvered mirror alone, and also is the overall reflectance.

<Comparison Between Color Tones>

See Table 1 below. The color tone of a mirror image on the half-silvered mirror of Example 6 was different from the color tone of the mirror image on the half-silvered mirror 40 of Example 5 used as a reference. It was therefore suggested that the color tone of the mirror image on the half-silvered mirror 40 varied by laminating another film on the back surface of the half-silvered mirror 40 with interposition of a transparent adhesive. The color tone of the mirror image obtained by the transmission display mirror of Example 4 was different from the color tone of the mirror image on the transmission display mirror of Example 5 in which only the half-silvered mirror 40 was used. In contrast, the color tone of the mirror image obtained by the transmission display mirror of Example 1 substantially matched the color tone of the mirror image of Example 5. The color tone of the mirror image of Example 3 substantially matched the color tone of the mirror image obtained on the half-silvered mirror alone. Therefore, the optical structure used for the transmission display mirror of Example 1 or Example 3 is suitable for increasing the transmittance of a half-silvered mirror without varying the color tone of a mirror image on the half-silvered mirror.

Table 1 summarizes compositions and evaluations of the transmission display mirrors and half-silvered mirrors of Example 1 to Example 6. In the table, the item of image visibility indicates that visibility is better as a larger number of "+" is shown. In addition, the item of image brightness indicates that the image is brighter as a larger number of "+" is shown. The transmittances in Example 1 to Example 3 were measured by emitting linear polarized light to the optical structures. The transmittance in Example 4 was measured by emitting linear polarized light to the light reflecting and transmitting member. The transmittances in Example 5 to Example 6 were measured by emitting linear polarized light to the half-silvered mirrors. In the optical structure and the light reflecting and transmitting member, linear polarized light is transformed into circularly polarized light by the quarter wave plate, and is then transmitted through the selective reflection films. In the half-silvered mirror, linear polarized light is transmitted without being transformed. Each measurement result is a measured value obtained in one trial, in which individual differences between samples and measurement fluctuation have not been considered.

TABLE 1

| | Element | Note | Example 1 | Example 2 | Example 3 | Example 4 | Example 5 | Example 6 |
|---|---|---|---|---|---|---|---|---|
| Front | first support member | 3-mm, 4-mm, or 5-mm glass | ✓ | ✓ | ✓ | ✓ | ✓ | ✓ |
| surface | partial reflection film | dielectric multilayer film | ✓ | ✓ | ✓ | ✓ | ✓ | ✓ |
| ↑ | air gap layer | half-silvered mirror side | ✓ | ✓ | ✓ | | | |
| | transparent adhesive layer | partial reflection film side | | | | ✓ | | ✓ |
| | antireflection film | toward partial reflection film | | ✓ | | | | |
| | protection film | 80-μm TAC | ✓ | ✓ | ✓ | | | |
| | transparent adhesive layer | protection film side | ✓ | ✓ | ✓ | | | |
| | selective reflection film | liquid crystal film | ✓ | ✓ | ✓ | ✓ | | |
| | transparent adhesive layer | quarter wave plate side | ✓ | ✓ | ✓ | ✓ | | |
| | quarter wave plate | generate circularly polarized light | ✓ | ✓ | ✓ | ✓ | | |
| | transparent adhesive layer | second support member side | ✓ | ✓ | ✓ | | | |
| | second support member | 1.3-mm or 3-mm glass | ✓ | ✓ | ✓ | | | |
| | transparent adhesive layer | antireflection film side | ✓ | ✓ | | | | |
| | antireflection film | toward display panel | ✓ | ✓ | | | | ✓ |
| ↓ | air gap layer | display surface side | ✓ | ✓ | ✓ | ✓ | ✓ | |
| Back | light-shielding plate | outer edge | | ✓ | | | | |
| surface | display panel | liquid crystal panel | ✓ | ✓ | ✓ | ✓ | ✓ | |
| Evaluation | image | visibility | ++ | ++ | ++ | ++ | | |
| | | brightness | ++ | +++ | +++++ | ++++ | | |
| | transmittance | | 52% | 53% | 64% | 61% | 34% | 45% |
| | reflectance | half-silvered mirror alone | 64% | 64% | 50% | 64% | 64% | |
| | | overall | 70% | 69% | 62% | 63% | 64% | 53% |
| | tone variation in mirror image | | none | none | none | ✓ | reference | ✓ |
| | mirror property on outer edge | | usual | good | | | | |

<Application of Transmission Display Mirror>

In one aspect, a transmission display mirror is a mirror that reflects figures of a human being and a product. In that mirror, a viewer views a mirror image reflected on the front surface of the transmission display mirror with his/her eyes. In that mirror, the viewer views an image superimposed on the mirror image with his/her eyes. In one aspect, the mirror is any of a mirror stand, a cheval glass, a wall-mounted mirror, and a desktop mirror. In one aspect, the mirror stand is used for a customer to look at his/her figure in trial fitting of a clothing item or trial use of cosmetics. In another aspect, the mirror is used for any of a wall, a window, a partition, a pillar, and a ceiling. The mirror is used for the surface of such a building material.

In one aspect, these mirrors display images brighter than mirror images in a manner superimposed on the mirror images. The images are advertisements for sales and the like as well as a route guide around the mirrors. In one aspect, the image displayed has a design property. In another aspect, the image is symbolic. In one aspect, these mirrors darken images to recover mirror images buried in the images.

In one aspect, the transmission display mirror further includes a sensor. In one aspect, the sensor reads a tag attached to a product. In one aspect, the tag includes a QR code (registered trademark) and other matrix codes, as well as a barcode. In another aspect, the tag includes an RFID and other hard tags. In one aspect, the transmission display mirror displays an image of information about the product in a manner superimposed on the mirror image.

<Mirror Display>

In one aspect, the transmission display mirror is a display apparatus. In the display apparatus, a viewer views an image and a mirror image reflected on the front surface of the transmission display mirror with his/her eyes. In one aspect, the display apparatus is a mirror display or a mirror television.

<Method of Displaying Image on Mirror Image>

In one aspect of use of the optical structure 10 shown in FIG. 1, a display apparatus is provided in which a mirror image reflected on the front surface is also an image. In one aspect, the display apparatus is obtained by replacing the half-silvered mirror in a display apparatus described in Japanese Unexamined Patent Application Publication No. 2019-137085 by the optical structure of the above-described embodiment.

In one aspect shown in FIG. 1, the display panel 30 emits the first image light consisting of the polarized light Fp from the back surface side of the second support member 20. The optical structure 10 outputs the first image light through the front surface of the first support member 15. The optical structure 10 thereby presents the first image on the front surface of the first support member 15. At this time, a traveling direction of the first image light is tilted with respect to the optical structure 10.

Further, in one aspect shown in FIG. 1, a second display panel not shown emits second image light as the external light Ex to the front surface of the first support member 15. The optical structure 10 reflects the second image light consisting of the external light Ex from the half-silvered mirror 40. The optical structure 10 presents a second image as a mirror image on the front surface of the first support member 15. At this time, a traveling direction of the second image light consisting of the external light Ex is tilted with respect to the optical structure 10. The traveling direction of the second image light after reflection follows the traveling direction of the first image light. In one aspect, the traveling direction of the second image light after reflection is parallel to the traveling direction of the first image light. A bright portion of the second image is presented in a dark portion of the first image. In addition, a bright portion of the first image is presented in a dark portion of the second image. Since the second image has an optical path longer than an optical path of the first image light, a pseudo stereoscopic display in which the first image looks like floating in the second image is obtained.

The present invention is not limited to the foregoing, and can be modified as appropriate within a range not departing from the scope of the invention.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An optical structure comprising a half-silvered mirror and a selective reflection film in combination, wherein the half-silvered mirror includes a first support member and a partial reflection film stacked on a back surface of the first support member, the partial reflection film reflects external light incident from a front surface side of the first support member to present a mirror image on the front surface side of the first support member, the selective reflection film is provided further to a back surface side of the half-silvered mirror so as to be opposed to the partial reflection film, throughout a visible light range of 400 nm to 750 nm, the selective reflection film more readily transmits one of left-handed circularly polarized light and right-handed circularly polarized light, which is hereinafter referred to as F polarized light, than the other, which is hereinafter referred to as R polarized light, and more readily reflects the R polarized light than the F polarized light, a reflectance of the selective reflection film for the R polarized light is higher than a reflectance of the partial reflection film for the F polarized light throughout the visible light range, an air gap layer being vacuum or including a space filled with gas is provided between the selective reflection film and the partial reflection film, the optical structure further comprising a second support member opposed to the first support member, wherein the selective reflection film is stacked on a front surface of the second support member, a protection film is further formed on a front surface of the selective reflection film, a thickness of the second support member is 0.5-3 mm, and wherein the selective reflection film and the partial reflection film are separated from each other by the air gap layer across an entire region in which the selective reflection film and the partial reflection film overlap, the air gap layer is a continuous cavity having a uniform thickness greater than 0 mm, the thickness of the air gap layer is less than one-half of the thickness of the first support member, the selective reflection film and the partial reflection film are substantially parallel to each other, and the air gap layer is configured such that first-order and second-order ghost images generated by reflections at interfaces do not overlap.

2. The optical structure according to claim 1, wherein the selective reflection film consists of either liquid crystal of a nematic liquid crystal and a smectic liquid crystal, the liquid crystal consists of a phase having chirality, and the phase consists of liquid crystal molecules with a chiral dopant added or liquid crystal molecules having chirality.

3. The optical structure according to claim 1, wherein the selective reflection film consists of a cholesteric liquid crystal.

4. The optical structure according to claim 1, wherein the partial reflection film consists of one of a dielectric multilayer film and a single-layer film of metal oxide, and is exposed to the space.

5. The optical structure according to claim 1, wherein an antireflection film is further formed on a front surface of the selective reflection film.

6. The optical structure according to claim 1, wherein an antireflection film is further formed on a back surface of the second support member.

7. The optical structure according to claim 1, wherein the half-silvered mirror has a reflectance larger than a transmittance.

8. The optical structure according to claim 1, wherein a quarter wave plate is further stacked between the selective reflection film and the second support member.

9. A method of operating the optical structure as defined in claim 8, the method comprising:

emitting image light consisting of linear polarized light or elliptically polarized light to a back surface side of the second support member to transform the image light into image light consisting of the F polarized light with the quarter wave plate;

outputting the image light consisting of the F polarized light through a front surface of the first support member to present an image brighter than the mirror image on the front surface of the first support member in a manner superimposed on the mirror image; and darkening the image light emitted to the back surface side of the second support member to recover the mirror image buried in the image on the front surface of the first support member.

10. A transmission display mirror which is a mirror that displays an image in a manner superimposed on a mirror image, comprising:

the optical structure as defined in claim 8; and a display panel configured to emit image light consisting of linear polarized light to a back surface of the second support member, wherein the display panel has a display surface that is opposed to the back surface of the second support member and outputs the image light consisting of the linear polarized light, the quarter wave plate has a fast axis and a slow axis tilted at 45° with respect to a polarizing axis of the linear polarized light in a direction in which the linear polarized light is transformed into polarized light Fp, and an air gap layer is provided between the second support member and the display panel.

11. The transmission display mirror according to claim 10, further comprising a light-shielding plate, wherein a back surface of the half-silvered mirror is entirely covered by the display panel covering a center of a back surface of the half-silvered mirror, and the light-shielding plate covering an peripheral edge of the back surface of the half-silvered mirror.

12. A transmission display mirror which is a mirror that displays an image in a manner superimposed on a mirror image, comprising:

the optical structure as defined in claim 8; and a display panel configured to emit image light consisting of linear polarized light to a back surface of the quarter wave plate, wherein the second support member is integrated with the display panel, the front surface of the second support member is a display surface of the display panel, the display surface outputs the image light consisting of the linear polarized light, and the quarter wave plate has a fast axis and a slow axis tilted at 45° with respect to a polarizing axis of the linear polarized light in a direction in which the linear polarized light is transformed into polarized light Fp.

13. A method of operating the optical structure as defined in claim 1, the method comprising:

emitting image light consisting of the F polarized light from a back surface side of the second support member and outputting the image light consisting of the F polarized light through the front surface of the first support member to present an image brighter than the mirror image on the front surface of the first support member in a manner superimposed on the mirror image; and darkening the image light to recover the mirror image buried in the image on the front surface of the first support member.

14. The method according to claim 13, further comprising emitting image light consisting of linear polarized light or elliptically polarized light further from a back surface side of a quarter wave plate provided on a back surface side of the selective reflection film to transform the image light into image light consisting of the F polarized light.

15. A method of operating the optical structure as defined in claim 1, the method comprising:

emitting first image light consisting of the F polarized light from a back surface side of the second support member at a tilt with respect to the optical structure and outputting the first image light consisting of the F polarized light through the front surface of the first support member to present a first image on the front surface of the first support member;

further emitting second image light as the external light from the front surface side of the first support member at a tilt with respect to the optical structure to present a second image as the mirror image on the front surface of the second support member; and presenting a bright portion of the second image in a dark portion of the first image and presenting a bright portion of the first image in a dark portion of the second image, on the front surface of the first support member.

16. A method of producing the optical structure as defined in claim 1, comprising:

laminating the protection film on which the selective reflection film is stacked, to the front surface of the second support member to form a filter, the protection film, the selective reflection film, and the second support member being sequentially aligned from a front surface toward a back surface in the filter;

overlapping the front surface of the filter and a back surface of the half-silvered mirror with interposition of gas; and fixing the half-silvered mirror and the filter with an attachment so as not to be separate from each other.

17. The optical structure according to claim 1, wherein the thickness of the air gap layer is greater than 0 mm and less than 2.5 mm.

* * * * *